D. R. PRUDEN.
ORNAMENTING HOLLOW ARTICLES OF METAL.

No. 32,850. Patented July 16, 1861.

Witnesses:

Inventor:

UNITED STATES PATENT OFFICE.

D. R. PRUDEN, OF WEST MERIDEN, CONNECTICUT, ASSIGNOR TO HIMSELF AND C. A. WELLINGTON, OF BOSTON, MASSACHUSETTS.

ORNAMENTING HOLLOW ARTICLES OF METAL.

Specification of Letters Patent No. 32,850, dated July 16, 1861.

*To all whom it may concern:*

Be it known that I, DANIEL R. PRUDEN, of West Meriden, in the county of New Haven and State of Connecticut, have invented a new and Improved Mode of Ornamenting the Exterior of Metal Cups or other Vessels or Hollow Articles of Metal; and I do hereby declare that the following is a full, clear, and exact description of the same, reference being had to the accompanying drawings, forming part of this specification.

My invention relates to the production in a less expensive manner upon the exteriors of cups or other vessels or hollow articles of metal, of ornaments of similar character to those produced by chasing, engraving, engine turning, and other slow and consequently expensive processes.

It consists in subjecting the articles to the process of spinning, with a burnisher, within a hollow die in which the reverse forms of the raised ornaments desired have been produced by engraving punching or other means.

Figure 1:
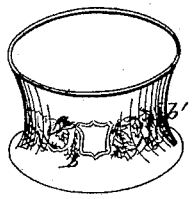
Figure 2:
Figure 3:
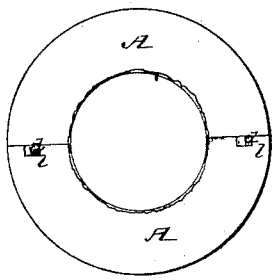
Figure 4:
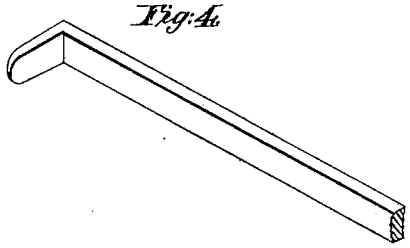

In the drawing, Figure 1 represents a napkin ring, having its exterior ornamented by my process. Figs. 2 and 3 represent axial and transverse sections of the die in which the ornamentation was produced. Fig. 4 represents a burnisher.

Similar letters indicate corresponding parts where they occur in the different figures.

The hollow die may be made of brass steel or other sufficiently hard metal, with its exterior cylindrical or slightly conical that it may be inserted tightly in a lathe chuck, and may be divided, in the direction of its axis, in two or more parts A, A, to permit the removal of the ornamented article, such parts being fitted together with dowels $d, d$, and mortises $l, l$, for the purpose of keeping them in proper relative positions. The die represented is made in two parts. When the die is to be used it is placed in the lathe tightly within the chuck; or the die itself eral parts are held together by its fitting tightly within the chuck, or the die itself may be fitted with a band and secured like a chuck, by being screwed on, or otherwise, to the main spindle of the lathe.

$a, a, b, b$, are the ornamental depressions in the die in which the corresponding raised ornaments $a', a' b', b'$, are produced. The burnishers which I employ are of various forms; according to the character of the ornaments to be produced—that represented in Fig. 4—is the form best adapted for general use. These burnishers are used in the hand supported upon a fixed but adjustable rest, as in the ordinary process of spinning metals, or may be secured in a slide-rest. The shell, cup or blank upon which the ornaments are to be produced is prepared by being spun, hammered or otherwise wrought into a suitable form to be inserted snugly into the hollow die, and the manipulation with the burnisher upon the interior of the shell, is substantially the same as in the ordinary spinning process.

This process of ornamenting differs from the ordinary process of spinning articles in metal, in the use of a hollow or female die, and in the burnisher being used upon the interior or back of the article to be ornamented instead of a solid or male die, and the use of the burnisher on the exterior or face of the article, the ornamented surface in one case being produced by the burnisher, and in the other case by the die.

What I claim as my invention, and desire to secure by Letters Patent, is:—

The method herein described of ornamenting the exterior of hollow articles, and which consists, substantially, in spinning the articles within the interior of a hollow die, as set forth.

D. R. PRUDEN.

Witnesses:
O. S. HULL,
E. B. BEACH.